Patented Mar. 3, 1942

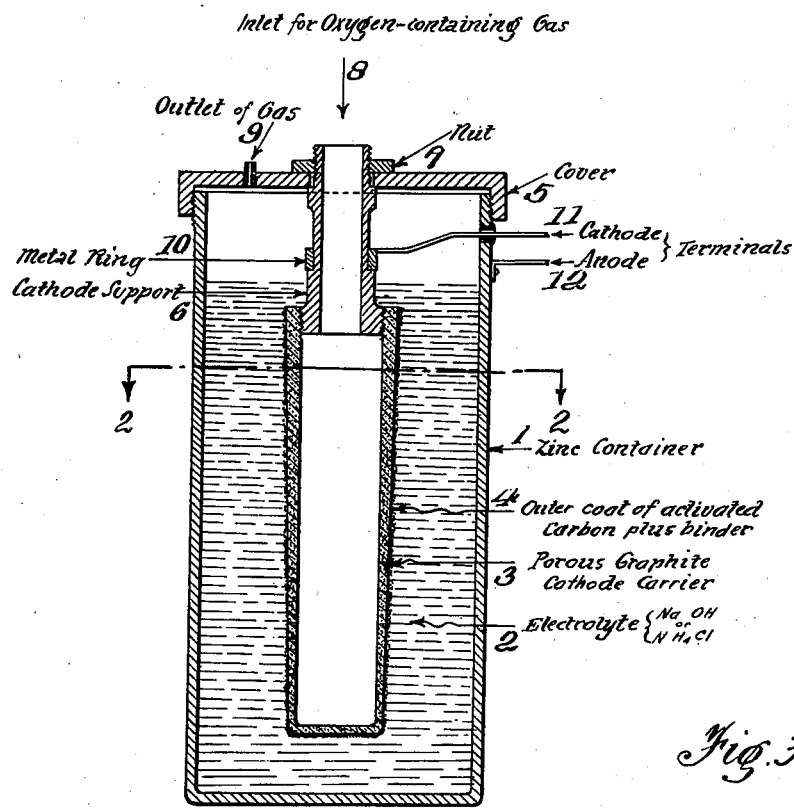
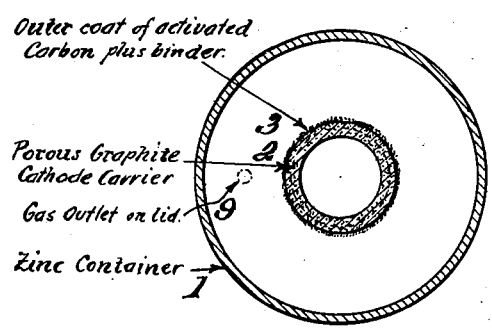
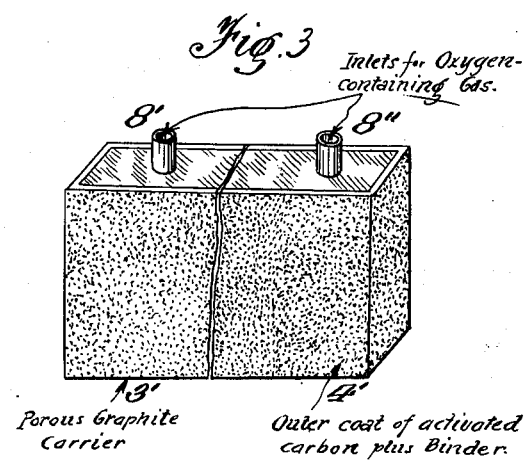

2,275,281

UNITED STATES PATENT OFFICE 2,275,281

DEPOLARIZATION MEANS

Ernst Berl, Pittsburgh, Pa.

Application January 24, 1938, Serial No. 186,731
In Great Britain December 16, 1936

3 Claims. (Cl. 136—86)

This invention relates to a method and means for improving the depolarization in air cells.

It is an object of the invention to improve the amperage, life and efficiency of air cells.

It is a further object of the invention to improve the diffusion of oxygen at the surface of contact between the electrode and the electrolyte which is ordinarily a slow process due to the blocking caused by nitrogen when air is used for the oxygen supply.

In addition, it is an object of the invention to increase the speed of depolarization which is ordinarily very slow when non-activated carbons are used such as normal carbon or wood charcoal.

More particularly it is an object of the invention to supply oxygen or air under somewhat elevated pressure to the cathode.

Also, the invention has as an object the provision of a cathode formed of electrically conductive activated carbon or a cathode with a surface layer of electrically conductive activated carbon as well as a method of applying such a layer to the cathode.

Furthermore, it is an object of the invention to combine the use of electrically conductive activated carbon with the provision of oxygen or air under elevated pressure.

The following detailed description will disclose other objects of my invention and it is to be construed as an illustration of the invention rather than as a limitation thereof.

Depolarization of the cathode is improved and an increased amperage per unit of cathode surface is obtained by increasing the amount of oxygen which reaches the boundary surface per unit of time. This result is best reached by supplying air under somewhat elevated pressure, to the cathode from the inside and thus causing it to travel from the electrode towards the electrolyte. The same effect is obtained by increasing the concentration of the oxygen in the gas used to an amount greater than that present in air. The best way of supplying the increased amount of oxygen is to supply the oxygen or gas containing oxygen to the cathode under somewhat elevated pressure and cause such oxygen or gas containing oxygen to travel from the electrode towards the electrolyte. It is important that there should always be present at the surface of contact more oxygen or any other oxidizing gas than is necessary to depolarize and burn the hydrogen which is formed at the cathode.

In order to obtain a very rapid depolarization it is of the greatest importance that at the surface of contact with the electrolyte one of the electrodes should comprise activated carbon which must be a good conductor of electricity. Those electrodes may consist wholly of activated carbon or more simply the surface of non-activated electrodes, for example those made from retort graphite may be covered with activated carbon. The activated carbon should have a surface of at least 50 square meters per gram and may be produced by different methods. The optimum effect is obtained with activated carbon produced in accordance with the methods described in my Patent No. 1,812,316, granted June 30, 1931, disclosing a method of making high grade activated carbon by treating acid sludges with a neutralizing agent and heating the mixture to 800° C. to 1200° C., and my Patent No. 1,851,888, granted March 29, 1932, disclosing a process for the manufacture of high grade activated carbon consisting in admixing solid carbonaceous material with substances containing organic potassium compounds and heating the mixture to 900° C. to 1300° C. Such activated carbon exhibits a very high developed internal surface and is a very good electrical conductor. Any other activated carbon possessing a high electrical conductivity may be employed.

Activated carbons which are good conductors of electric current yield much better results than other activated carbons which are not good conductors of electric current, for example activated carbons produced by the treatment of organic material such as wood with zinc chloride at rather low temperatures. On the other hand, carbons which exhibit good electrical conductivity but which are not activated, such as for example certain wood charcoals, highly porous retort graphite, or porous products from the oil industry such a petrol coke, do not show any appreciable depolarizing effect when employed as material for electrodes in air cells.

Another feature of the invention is that activated carbon of the type that is a good conductor of electricity may be employed in conjunction with non-activated carbon which is also a good electrical conductor, for example in combination with retort graphite or with electrodes made from strongly heated petroleum coke. The activated carbon may be introduced at the boundary surface by forcing the same into the small holes under pressure or by any other method suitable for covering the surface. I have found that a very thin layer of electrically conductive activated carbon on the base material is sufficient with the help of the oxygen of the air to depolarize very quickly the hydrogen formed at the surface boundary between the electrode and the electrolyte. A depolarizer such as manganese dioxide is therefore unnecessary.

A combination giving particularly fine results is made by combining the provision of air or oxygen under pressure with a cathode consisting of or coated with electrically conductive activated carbon.

The conventional types of electrolyte may be used. An aqueous solution of sodium hydroxide or of ammonium chloride forms probably the best electrolytes.

It is of great advantage to bring the finely powdered electrically conductive activated carbon into contact with the surface of the base material used in the cathode with the help of hydrophobe substances which also resist alkaline attack. Substances of this type which have no tendency to crystallize are preferred. It is important that the binder for the activated carbon be water repellent in order that the aqueous solution constituting the electrolyte may not easily enter the fine capillaries of the electrode. Otherwise, the concentration of oxygen at the surface of contact between the electrode and the electrolyte would be reduced, and the functioning of the cell would be impaired.

Several classes of substances may be employed for this purpose such as ethyl cellulose, and other highly substituted cellulose ethers have proved especially useful. Other materials, such as, for example, aliphatic or aromatic hydrocarbons, or resins, preferably artificial resins of the phenol-aldehyde type, urea resins or polyvinyl substances may also be employed for the same purpose.

The accompanying drawing illustrates the principle of the invention by way of example, without limiting its scope to the precise device shown.

Fig. 1 shows a longitudinal section through a cell according to the invention;

Fig. 2 shows a transvere section of a cell according to Fig. 1, taken along section 2—2;

Fig. 3 shows a cathode with a plurality of gas inlets.

More particularly, container 1, made of suitable metal such as zinc, of the battery is filled with an alkali electrolyte 2 (for instance sodium hydroxide or amonium chloride). In the electrolyte 2 is immersed a cathode carrier 3 of a hollow porous graphite, the outside of which is coated with a very thin layer 4 of activated carbon by means of a water repellent and alkali resisting binder. The cathode carrier 3 is fastened to cover 5 by means of a hollow cathode support 6 and nut 7. Circulating means (not shown) for an oxygen containing gas (such as air) are connected with gas inlet 8. The gas passes through the interior of cathode support 6 into the hollow interior of the porous carrier 3 and is extruded through the pressure exerted by the circulating means through its graphite wall and through the activated layer carbon 4 into the electrolyte 2. The oxygen reacts on the contact surface of the activated carbon layer 4 with the hydrogen atoms which are formed by the electrochemical reaction, and thereby effects a quick depolarization. The excess gas leaves the interior of the cell through outlet 9 and is recirculated by the circulating means. A metal ring 10 fastened to cathode support 6 connects the cathode terminal, while anode 12 is directly connected with zinc container 1.

It is possible in a cathode according to the invention to have a plurality of inlets 8' and 8'' for the oxygen containing gas, which extrudes under pressure through the porous graphite carrier 3 and the outer coat of activated carbon and binder 4.

The following example serves to illustrate the invention, which is not restricted thereby:

*Example*

The following description relates to the preparation of a cathode from a cylinder, closed at one end and consisting of porous retort graphite. Finely powdered activated carbon which is a good conductor for electric current, is homogeneously distributed in a solution of ethyl cellulose, (containing for example 2½ ethyl groups per $C_6H_{10}O_5$ unit), in benzene-alcohol. A weight of ethyl cellulose ranging from .5 to 15% of the activated carbon may be employed. This suspension of highly activated carbon in the solution of ethyl cellulose in benzene-alcohol is sprayed onto the electrode. The solvents evaporate and a thin layer of activated carbon which is sufficient to produce the desired effect is formed. The resulting electrode is closed at the open end and air, preferably filtered, is pressed through the pores of the electrode. In order to remove carbon dioxide from the air, sodium hydroxide or any other alkali may be introduced into the interior of the cylindrical electrode. An anode of zinc and an electrolyte of an alkali, for instance sodium hydroxide, are employed. When a sufficient supply of air is pressed through the cathode the element functions with excellent effect. It is possible to produce continuously per 100 sq. cm. of cathode surface several tenths of an ampere or in extreme cases several amperes. When the element is charged with too high a current the life of the cathode decreases because insoluble zincates are formed which decrease the active surface. At a current of several tenths ampere per 100 sq. cm., which is much higher than that obtainable by the action of the known air cells, the element gives a very good performance during long periods. From time to time the zinc must be renewed and the electrolyte changed. The cathode itself remains practically unaltered, but after long use it is an advantage to remove the cathode, wash the dilute acid and afterwards with water, dry and cover with a new layer of electrically conductive activated carbon and ethyl cellulose.

I claim:

1. A battery comprising an electrolyte, electrodes, one of said electrodes comprising a porous support, an electrically conductive highly activated carbon layer on said support, a water repellent, alkali resisting, highly substituted cellulose ether binding said layer to said support and serving as an anti-wetting agent, and means for supplying an oxygen containing gas under pressure to the surface of contact between the electrolyte and said layer.

2. A battery comprising an electrolyte, electrodes, one of said electrodes comprising a porous support, an electrically conductive highly activated carbon layer on said support, a water repellent, alkali resisting alkyl celluose binder securing said layer to said support and serving as an anti-wetting agent, and means for supplying an oxygen containing gas under pressure to the surface of contact between said electrolyte and said layer.

3. A battery comprising an electrolyte, electrodes, one of said electrodes comprising a porous support, an electrically conductive highly activated carbon layer on said support, a water repellent, alkali resisting ethyl cellulose binder securing said layer to said support and serving as an anti-wetting agent, and means for supplying an oxygen containing gas under pressure to the surface of contact between said electrolyte and said layer.

ERNST BERL.